United States Patent Office 3,247,881
Patented Apr. 26, 1966

3,247,881
PNEUMATIC TIRE TREAD CONTAINING A SYNTHETIC RUBBER, ASPHALT, AND FILLER
Bernard C. Barton, Kinnelon, and Hendrik K. J. de Decker, Montclair, N.J., and Seymour A. Lippmann, Detroit, Mich., assignors of one-half to United States Rubber Company, New York, N.Y., a corporation of New Jersey, and one-half to U.S. Chemical Company, New York, N.Y., a corporation of Delaware
No Drawing. Filed Feb. 21, 1963, Ser. No. 260,294
17 Claims. (Cl. 152—330)

This application is a continuation-in-part of our application Serial No. 104,246, filed April 20, 1961, and now abandoned.

This invention relates to an improved pneumatic tire and more particularly it relates to a tire having quiet riding characteristics and embodying a tread which is based on a mixture of SBR and/or polybutadiene and solid asphalt.

Pneumatic tires manufactured today have treads based on a composition comprising SBR (synthetic butadiene-styrene copolymer rubber) or equivalent rubber, combined with suitable reinforcing fillers and with extender materials, as well as the necessary protective and vulcanizing chemicals. Treads based on such stocks give excellent service, in many respects. However, they suffer from a deficiency which has become increasingly important in recent years. The deficiency lies in the road noise produced by a tire made with such tread stock. In recent years, automobile manufacturers have spent large sums of money to perfect and produce quiet, smooth-running vehicles, and have succeeded in reducing the noise level of their machines to a great extent. Tire manufacturers also have spent considerable time and money in redesigning their tire treads to produce minimum noise, but further improvement has been desired. Tires made of butyl rubber are used to a limited extent, largely because they have quiet riding qualities, but this solution to the problem of providing a quiet ride unfortunately suffers from certain disadvantages from an economic and manufacturing standpoint.

It is a principal object of the present invention to produce from butadiene-styrene copolymer rubber or polybutadiene rubber or a mixture thereof a high quality tire with improved noise characteristics.

The invention depends on the unexpected discovery that a pneumatic tire tread based on a mixture of butadiene-styrene copolymer rubber (SBR) or polybutadiene rubber or both and a certain kind of solid asphalt provides remarkably quiet riding characteristics. We believe that the quietness of ride produced by the tire of the invention having a tread based on SBR-solid asphalt mixture or polybutadiene-solid asphalt mixture of the present kind is a consequence of an apparent remarkable ability of such a tread to damp vibrations in the tire that lead to noise. We further believe that the success of the present tire in this respect is directly associated with the remarkable ability of the tread composition to effectively damp vibrations in the speed and temperature ranges normally met, for which the noise properties of tires are generally important in use of passenger cars, i.e. operating temperatures from 70° F. to 150° F. and speeds from 10 to 40 m.p.h.

It is an unusual and highly useful characteristic of the present tread composition, based on SBR or polybutadiene (or mixture thereof) and solid asphalt, that it has a particularly high "damping factor" or "loss factor," as measured by methods such as that disclosed in an article entitled "Dynamic-Mechanical Characteristics of Rubber Compounds" by De Mey and Van Amerongen appearing in Rubber Chemistry and Technology, vol. 29 (1956), pages 1215–1232. The loss factor or damping factor may be defined as the ratio of dynamic hysteresis to dynamic elastic modulus, and may be measured, as described by De Mey and Van Amerongen, by applying cyclic vibration in definite amplitude to a sample of the material under extension, and measuring the damping effect. The damping factor is thus a measure of the fraction of the mechanical energy in vibrating rubber that is degenerated into heat per cycle of vibration. A large damping factor is highly significant as attested by the low noise characteristics of tires made from materials with such property.

The rubbery material employed in the present invention is, as indicated, selected from the group consisting of butadiene-styrene copolymer rubbers (containing up to abou 55% styrene, preferably up to about 45% styrene, and more preferably about 20–40% styrene), and polybutadiene rubbers (especially polybutadiene having a high content of polymer having the cis-1,4 structure), and mixtures thereof in any desired proportions (e.g., 5–95% SBR and correspondingly 95–5% polybutadiene).

The solid asphalt employed in admixture with SBR and/or polybutadiene in the invention is a solid residue of petroleum refinery operations, such as a bottom residue of crude petroleum oil distillation. It is essentially hydrocarbon in nature, and has a wide range of molecular weight distribution, ranging from molecular weights in excess of 2,000,000 to weights of less than 1,000. Such asphalts are very hard materials below 0° C., and are solids at room temperature but gradually soften as the temperature goes up, until they are readily pourable at 200° C. and up. For purposes of the invention it is important that a solid asphalt of a particular kind be employed. The kind of solid asphalt that is suitable for use in the invention is most significantly characterized by its penetration value. In accordance with the invention, the solid asphalt employed has a penetration value of from 180 to 425, and preferably from 190 to 250, expressed as the distance in hundredths of a centimeter that a standard needle penetrates vertically into a sample of the material under a loading of 100 grams in a period of 5 seconds at 25° C. (77° F.), as measured by standard procedures (e.g., ASTM: D5–61). The presently employed solid asphalt may also be described as having a corresponding softening point of from about 115° F. to 85° F. (there is an inverse relationship between penetration and softening point), preferably 105° F. to 90° F., as measured by the standard ring and ball method, or equivalent standard procedure (e.g., ASTM: D36–26). It is furthermore important for purposes of the invention that the asphaltene content be as low as possible, not higher than 18%, and preferably as close to zero as feasible (e.g., less than about 7%). The asphaltene content may be defined as the fraction of the asphalt insoluble in n-pentane or 88° petroleum naphtha as determined by well-known methods.

The specific gravity (25°/25° C.; 77°/77° F.) of the asphalt is generally from about 1.001 to about 1.020, although material having a specific gravity of as low as about 1.000 or as high as about 1.030 can also be used. The flash point (Cleveland open cup method) is preferably within the range of from about 500° F. to about 575° F.

Typical suitable asphalts are the following:

|  | Trade Designation | | |
|---|---|---|---|
|  | Texaco TX 4035 | Texaco TX 3753 | Texaco A 200 |
| Penetration at 25° C. (77° F.), 100 grams, 5 sec. (cm.×100) | 230 | 247 | 195–203 |
| Softening point, ° F | 95 | 96 | 104 |
| Asphaltenes, percent | 7 | 16.7 | 14–17.7 |
| Specific gravity | 1.001 | 1.020 | 1.006–1.020 |
| Flash point, ° F | 505 | 520 | 500–575 |

The improved quiet-riding tread composition of the invention contains 100 parts by weight of SBR and/or polybutadiene rubbers (with or without oil extenders), and from 18 to 60 parts (preferably from 30 to 50 parts) of a solid asphalt of the kind described, along with any other desired conventional compounding ingredients in conventional amounts, including fillers such as carbon black, silica, lignin, (usually in amount of from 20 to 90 parts); vulcanizing agents such as sulfur, accelerators; antioxidants; softeners or processing aids; etc. The tread composition may be mixed in conventional rubber mixing equipment, such as internal mixers or open roll mills, in the usual manner, after which the tread may be formed in the desired shape by extrusion or other suitable conventional methods, and thereafter applied to a tire carcass. The tire carcass may be assembled in accordance with conventional practice by superimposing any desired number of plies of tire cord fabric, rubberized with any conventional tire carcass composition, on a collapsible tire building drum in the usual manner. Thereafter, the assembly of novel tire tread and carcass may be shaped and vulcanized in a mold under heat and pressure, in the conventional manner. The resulting tire having a tread formulated in accordance with the invention will be found to be surprisingly quiet riding and, in fact, in this respect the advantages of the invention are not obtainable by simply mixing SBR or polybutadiene with the usual oil extenders, including asphaltic oils. Such oil extenders do not provide, when mixed with SBR or polybutadiene or mixtures thereof, the desired quietness of ride, such as is provided by the present mixtures of rubber and solid asphalt. Thus, the use of asphaltic oils as in U.S. Patent 2,904,527, Garwin, Sept. 15, 1959, does not serve the purposes of this invention. Furthermore, the purposes of the invention are not served by following the teachings of British specification 714,954, Phillips Petroleum Co., September 8, 1954. "Asphalt No. 6" as used by Phillips Petroleum has a low penetration value of 20 to 50, and a high softening point of 165°–190° F., in contrast to the presently employed asphalt.

We have found that mixing of SBR or polybutadiene or both with asphalt of the particular kind defined herein is not only a successful approach to the problem of providing a quiet-ride tire, but offers in addition the following definite advantages:

(1) Considerably more asphalt of the present kind than oil can be added to the rubber without encountering undesirable reduction in viscosity of the rubber stock and without impairing the processability.

(2) Solid asphalt will migrate to a considerably less extent than oil, from the tread to adjoining rubber layers; this is important in building tires where stocks of several different compositions have to be adhered to the tread stock.

(3) It is surprisingly found that energy losses in the vulcanizates (heat build-up) are reduced by the presence of solid asphalt, of the kind employed herein, especially at temperatures over 200° F. On the other hand, the admixture of the present solid asphalt will increase the stiffness, the energy losses, and the damping or the lack of resilience at lower temperatures. This leads to an unusual tread material, having low heat build-up at the elevated temperatures which occur at high speeds and, nevertheless, providing a considerable damping of noise-producing vibrations at the temperatures encountered in normal city use. This behavior is in contrast to that of ordinary oil-extended SBR, and is important for the manufacture of tires that perform well at high temperature (high speed), but are quiet-riding at lower temperatures (low speed).

(4) Important economic advantages exist in the invention due to the low price of the presently employed solid asphalt as compared to other methods of obtaining tread materials for noise suppression in tires, and in this respect the present novel approach is especially advantageous when compared to the use of butyl rubber.

(5) Compatibility of the present solid asphalt-SBR and/or polybutadiene mixtures with all Hevea and SBR types is complete.

(6) Processing behavior of the present rubber and solid asphalt masterbatches is good, being better than that of oil-extended rubber masterbatches at the same level of extension.

The preparation of the tread material of this invention is very simple, using standard mixing equipment with little or no modification. The rubbery polymer portion of the mixture may be any polybutadiene or styrene-butadiene copolymer suitable for tire tread applications. These include hot- or cold-polymerized polymers or copolymers having a raw unextended Mooney viscosity of 80 or higher. Hot-polymerization is generally carried out at 122° F.; the cold-polymerization is usually carried out at 43° F. An example of a commercially available "hot" SBR type polymer in this group is Synpol (trademark of Texas-U.S. Chemical Co.) 1012, a high Mooney, unextended butadiene-styrene "hot" copolymer having about 23% bound styrene and a raw Mooney viscosity of 95–115. An example of a "cold" SBR type material is the copolymer used in making Synpol 1712. The copolymer in this oil-extended Synpol is butadiene-styrene "cold" copolymer having about 23% bound styrene and a raw unextended Mooney viscosity of 110–125. Another example of a "cold" SBR type material is the copolymer used in making Synpol 8202. The copolymer in this oil-extended Synpol is a butadiene-styrene "cold" copolymer having about 23% bound styrene and a raw unextended Mooney viscosity of 120–140.

The polymer rubbers employed in the invention may be of the unextended kind, or of the oil-extended kind containing up to 30 parts (e.g., 5 to 30 parts), per 100 parts by weight of rubber, of a hydrocarbon oil plasticizer having a boiling point in excess of about 400° F.

In addition to the polymers just mentioned, SBR types having higher styrene content than standard materials have been found to be very satisfactory. A particularly good material is obtained by blending a "cold" SBR having 38% bound styrene with 37.5 parts of a solid asphalt having a penetration of 200 and a ring and ball softening point of 104° F.

The rubbery polymer portion (which may if desired be a blend of more than one polymer of the kind described) may be mixed with the solid asphalt portion by several means. The rubber in the latex state may be mixed with the solid asphalt in an emulsified state, the resultant mixture may then be coagulated, washed and dried in the normal manufacturing system, producing a solid asphalt/rubber crumb in an easily handled form. Or, alternatively, the solid asphalt may be mixed in the solid state with the polymer also in the solid state. The mixing may also be performed on conventional rubber processing equipment such as rubber mills, or in internal mixers such as Banbury mixers. One preferred method of blending is through the latex/solid asphalt emulsion system. This provides an excellent blend with a minimum of handling problems.

It has been found, for example, that with an SBR containing 23% bound styrene, improved quiet-riding properties are obtained with as little as 25 or 37.5 parts of the present asphalt, and very good quiet-riding qualities are obtained with 50 parts of asphalt. We have also found that with a polymer containing, for example, 38% bound styrene, the damping factor or loss factor increases (and quiet-riding properties correspondingly improve) as the amount of the asphalt present increases. Thus, at 38% bound styrene and 37.5 parts of asphalt the damping factor is near that of butyl rubber and the tires are substantially as quiet as butyl tires. Damping factors in the neighborhood of .18–.25 represent relatively noisy tires such as are obtained from conventional natural rubber or SBR tread stocks. Preferred compositions of the invention containing asphalt of the kind described yield substantially higher damping factors, of the order of .35 to .40 and more, and they are comparable in quietness to butyl rubber (damping factor as high as .50). However, the present tread compositions containing asphalt and having damping factors at least in excess of .30 represent a definite improvement over prior natural rubber or SBR conventional compositions. It is desired to emphasize that for purposes of the invention satisfactory damping properties (with consequent quietness) are obtained (while retaining the other qualities desired in the tire tread stock) only with asphalt having a penetration value and a ring and ball softening point within the specified ranges (180 to 425, and 85° F. to 115° F., respectively), as can be seen from the following table:

softening point of the asphalt is to this temperature, the more effective it is at that temperature.

The following examples, in which all proportions are expressed by weight, will serve to demonstrate the practice of the invention in more detail.

EXAMPLE 1

An asphalt emulsion may be prepared by mixing vigorously in a homogenizer the following materials:

| | Parts |
|---|---|
| Solid asphalt | 100 |
| Water | 97.4 |
| Emulsifying agent [1] | 2.0 |
| Sodium hydroxide | 0.6 |

[1] E.g. sodium oleate, or other conventional emulsifiers such as the sodium salt of rosin acid.

The asphalt used in this example has a penetration of 195, a ring and ball softening point of 104° F., an asphaltene content of about 17.7%, a specific gravity of 1.020, and a flash point of 575° F.

The asphalt emulsion may then be blended with latex of SBR copolymer rubber (having 23% bound styrene and a Mooney viscosity ML–4 (212° F.) of 115–130) in various proportions sufficient to provide the concentrations of asphalt shown in columns E, F and G in Table I, below. The latex-asphalt emulsion may be coagulated with 3% sulfuric acid, the coagulum may be washed with water, and dried. The Mooney viscosity of the rubber-asphalt blend in stocks E, F, and G is about 45–60.

The resulting asphalt-SBR mixes may then be compounded conventionally for vulcanization as tire tread stocks (using, for example, 50 parts carbon black, 3 parts zinc oxide, 1 part stearic acid, 1.75 parts sulfur, 0.6 part mercaptobenzothiazole, and 0.3 part diphenyl-

| Penetration Value of Asphalt | Softening Point of Asphalt, °F. | Damping Factor of SBR-Asphalt Tread Stock at 110° F. | Quietness of Ride | Amount of Asphalt per 100 Parts SBR | Styrene Content of SBR, percent |
|---|---|---|---|---|---|
| Greater than 425 (outside invention) | 70 | 0.29 | Poor | 50 | 23 |
| 230 (invention) | 95 | 0.32 | Fair | 50 | 23 |
| 247 (invention) | 96 | 0.34 | Good | 50 | 23 |
| 200 (invention) | 104 | 0.41 | Excellent | 50 | 23 |
| Do | 104 | 0.41 | do | 37.5 | 9.5 |
| Less than 180 (outside invention) | 131 | 0.29 | Poor | 37.5 | 9.5 |

The invention therefore makes it possible to produce quiet-riding tire treads, based on mixtures of polybutadiene and/or SBR rubbers and a solid petroleum asphalt, with varying amounts of bound styrene in the SBR rubbers and asphalt of varying softening points (within the range disclosed), and these factors may be adjusted and correlated to yield the most desirable balance of quiet ride properties with other properties such as stiffness, abrasion resistance, cracking, etc. Preferably, the softening point of the asphalt should be as close as possible to the temperature at which the maximum damping effect is frequently desired, namely, 110° F., which is a typical representative operating temperature for tires at speeds for which noise characteristics of the tire are regarded as being particularly important. By the same token, this temperature, 110° F., is also the temperature at which it is preferred to measure the damping factor of the tread composition. Usually, the closer the guanidine, and any other desired suitable compounding ingredients, per 100 parts of asphalt-SBR mix). After curing for 45 minutes at 45 pounds steam, the tread stocks have the properties shown in columns E, F, and G in Table I. For purposes of comparison Table I includes data obtained on a typical conventional butyl rubber tread stock (column A), a natural rubber stock (column B), an ordinary SBR tread (column C), an oil-extended SBR tread (column D), and a high-styrene SBR stock with asphalt (column H).

The damping factor is determined on a modified dynamic test apparatus, generally similar to that used by De Mey and Van Amerongen, which applies a cyclic strain, having a frequency of 320 cycles per second and a peak-to-peak amplitude of 0.2%, to the sample at 110° F. The relative values of the damping factor are particularly significant.

Table I

| | Stock | | | | | | | |
|---|---|---|---|---|---|---|---|---|
| | A | B | C | D | E | F | G | H |
| | Rubber | | | | | | | |
| | Butyl 215 | Natural | SBR 1500 | SBR 1712 | SBR [1] 23% styrene | SBR [1] 23% styrene | SBR [1] 23% styrene | SBR [1] 38% styrene |
| Parts of polymer | 100 | 100 | 100 | 100 | 100 | 100 | 100 | 100 |
| Parts of asphalt | | | | | 25 | 37.5 | 50 | 37.5 |
| Parts of oil | | | | 37.5 | | | | |
| Modulus at 300% elongation, p.s.i | 1,300 | | 1,310 | 1,200 | | 1,330 | 795 | 1,310 |
| Elongation at break, percent | 410 | | 520 | 500 | | 480 | 500 | |
| Damping factor | .50 | .18 | .25 | .23 | .31 | .33 | .41 | .45 |
| Relative value of damping factor | 100 | 36 | 50 | 46 | 62 | 66 | 82 | 90 |

[1] Mooney ML-115-130 at 212° F.

As may be seen from Table I, the addition of the solid asphalt material significantly increased the damping effect of the polymer (columns E, F and G, and column H), and made it possible to approach butyl (column A) rubber in this respect, whereas the addition of oil (column D) had the opposite effect. The increase in damping factor indicates that the treads containing asphalt will provide an improved tread from the standpoint of quietness of ride, compared to natural rubber (column B), or compared to SBR that does not contain the asphalt (columns C and D). The compositions of the invention having a damping factor of .35 or more are particularly preferred, since they are directly competitive with butyl rubber treads in this respect. In general, compositions having a damping factor greater than .30 represent a significant improvement over ordinary SBR or natural rubber tread compositions, from the standpoint of noise.

Polybutadiene rubber may be substituted for SBR in the foregoing example with similar results. Similarly, a mixture of polybutadiene rubber and SBR may be substituted.

EXAMPLE 2

A series of tread compositions were prepared, according to the formulations outlined below, and these tread compositions were used to build groups of pneumatic tires which otherwise had conventional carcasses and other parts. The first two groups of tires listed in Table II below had treads based on solid asphalt-SBR mixtures in accordance with the invention. For a comparison, three other groups of tires, namely, group #3, group #4 and group #7 were made with treads of conventional oil-extended SBR. Two further groups of test tires, #5 and #6, based respectively on butyl rubber and standard, unextended SBR, were included in the series for purposes of comparison. All rubbers were compounded in a standard receipe as shown in Table II.

Table II

| Group Number | 1 | 2 | 3 | 4 | 5 | 6 | 7 |
|---|---|---|---|---|---|---|---|
| SBR (38% styrene) | 100 | 100 | 100 | 100 | | | |
| SBR (23% styrene; 50 Mooney) | | | | | | 100 | |
| SBR (23% styrene; 115 Mooney) | | | | | | | 100 |
| Butyl rubber | | | | | 100 | | |
| Solid asphalt [1] | 37.5 | 37.5 | | | | | |
| Highly aromatic oil (Philrich No. 5) [2] | | | 37.5 | | | | 37.5 |
| Naphthenic oil (Texaco 750 pale oil) [3] | | | | 37.5 | | | |
| High abrasion furnace carbon | 50 | 60 | 60 | 60 | | 50 | 50 |
| Medium processing channel carbon black | | | | | 50 | | |
| Sulfur | 1.5 | 1.75 | 1.75 | 1.75 | 1.25 | 1.75 | 1.75 |
| Zinc oxide | 3 | 3 | 3 | 3 | 3 | 3 | 3 |
| Stearic acid | 1 | 1 | 1 | 1 | 1 | 1 | 1 |
| N-methyl-N,4-dinitrosoaniline (Elastopar) | | | | | .9 | | |
| Benzothiazyl disulfide | | | | | 1 | | |
| Tellurium diethyldithiocarbamate | | | | | 1 | | |
| Copper dimethyldithiocarbamate | | | | | 1.25 | | |
| Mercaptobenzothiazole | .6 | .6 | .6 | .6 | | .6 | .6 |
| Diphenylguanidine | .3 | .3 | .3 | .3 | | .3 | .3 |

[1] Penetration 195, softening point 104° F.
[2] Commercially available oil for extending rubber; highly aromatic petroleum oil with a specific gravity of .965 to 1.050 and a viscosity (SUS at 210° F.) of 300 max.
[3] Commercially available oil for extending rubber; naphthenic petroleum oil with a specific gravity of about 0.937 and a viscosity (SUS at 210° F.) of 58.5.

The tires made with treads of the composition shown in Table II were tested by expert appraisers for noise rating, ride hardness, ride "stability," wear rating, crack resistance, and cold weather rolling resistance, skid, and traction. Tires in group #5 (butyl rubber) were rated best for quiet-riding followed closely by tires in groups #1 and #2. Tires in groups #'s 3, 4, 6 and 7 were entirely unsatisfactory from the standpoint of noise.

The road tests showed tires of groups #1 and #2 to be satisfactory for wear rating, crack resistance, "ride stability" and cold weather properties.

Having thus described our invention, what we claim and desire to protect by Letters Patent is:

1. A pneumatic tire characterized by quiet-riding qualities, having a tread consisting essentially of, in admixture, (a) synthetic rubbery polymeric material selected from the group consisting of polybutadiene, copolymers of butadiene with up to 55% by weight of combined styrene, and mixtures thereof, (b) from 18 to 60%, based on the weight of (a), of a solid petroleum asphalt having a penetration value of 180 to 425, expressed as hundredths of a centimeter, under a load of 100 grams in a period of 5 seconds at 25° C. and a ring and ball softening point of 85° F. to 115° F., and (c), from 20 to 90% based on the weight of (a), of a reinforcing filler.

2. A pneumatic tire characterized by quiet-riding qualities, having a tread consisting essentially of, in admixture, (a) synthetic rubbery butadiene-styrene copolymer containing up to 55% by weight of combined styrene, (b) from 18 to 60%, based on the weight of (a), of a solid petroleum asphalt having a penetration value of 180 to 425, expressed as hundredths of a centimeter, under a load of 100 grams in a period of 5 seconds at 25° C. and a ring and ball softening point of 85° F. to 115° F., and (c) from 20 to 90%, based on the weight of (a), of carbon black.

3. A pneumatic tire characterized by quiet-riding qualities, having a tread consisting essentially of, in admixture, (a) synthetic rubbery butadiene-styrene copolymer containing from 20% to 40% by weight of combined styrene, (b) from 18 to 60%, based on the weight of (a), of a solid petroleum asphalt having a penetration value of 180 to 425, expressed as hundredths of a centimeter, under a load of 100 grams in a period of 5 seconds at 25° C. and a ring and ball softening point of 85° F. to 115° F., and (c), from 20 to 90% based on the weight of (a), of a reinforcing filler.

4. A pneumatic tire characterized by quiet-riding qualities, having a tread consisting essentially of, in admixture, (a) polybutadiene rubber, (b) from 18 to 60%, based on the weight of (a), of a solid petroleum asphalt having a penetration value of 180 to 425, expressed as hundredths of a centimeter, under a load of 100 grams in a period of 5 seconds at 25° C. and a ring and ball softening point of 85° F. to 115° F., and (c) from 20 to 90%, based on the weight of (a), of carbon black.

5. A pneumatic tire characterized by quiet-riding qualities, having a tread consisting essentially of, in admixture, (a) synthetic rubbery polymeric material selected from the group consisting of polybutadiene, copolymers of butadiene with up to 55% by weight of combined styrene, and mixtures thereof, (b) from 18 to 60%, based on the weight of (a), of a solid petroleum asphalt having a penetration value of 190 to 250, expressed as hundredths of a centimeter, under a load of 100 grams in a period of 5 seconds at 25° C., a ring and ball softening point of 90° F. to 105° F., an asphaltene content of not more than 18%, a specific gravity of 1.001 to 1.020 (25°/25° C.) and a Cleveland open cup flash point of 500° F. to 575° F., and (c), from 20 to 90% based on the weight of (a), of a reinforcing filler.

6. A pneumatic tire characterized by quiet-riding qualities, having a tread consisting essentially of, in admixture, (a) synthetic rubbery polymeric material selected from the group consisting of polybutadiene, copolymers of butadiene with up to 45% by weight of combined styrene, and mixtures thereof, (b) from 18 to 60%, based on the weight of (a), of a solid petroleum asphalt having a penetration value of 190 to 250, expressed as hundredths of a centimeter, under a load of 100 grams in a period of 5 seconds at 25° C., a ring and ball softening point of 90° F. to 105° F., an asphaltene content of not more than 18%, a specific gravity of 1.001 to 1.020 (25°/25° C.) and a Cleveland open cup flash point of 500° F. to 575° F., and (c) from 20 to 90%, based on the weight of (a), of carbon black.

7. A pneumatic tire characterized by quiet-riding qualities, having a tread consisting essentially of, in admixture, (a) synthetic rubbery butadiene-styrene copolymer containing from 20% to 40% by weight of combined styrene, (b) from 18 to 60%, based on the weight of (a), of a solid petroleum asphalt having a penetration value of 190 to 250, expressed as hundredths of a centimeter, under a load of 100 grams in a period of 5 seconds at 25° C., a ring and ball softening point of 90° F. to 105° F., an asphaltene content of not more than 18%, a specific gravity of 1.001 to 1.020 (25°/25° C.) and a Cleveland open cup flash point of 500° F. to 575° F., and (c) from 20 to 90%, based on the weight of (a), of carbon black.

8. A pneumatic tire characterized by quiet-riding qualities, having a tread consisting essentially of, in admixture, (a) polybutadiene rubber (b) from 18 to 60%, based on the weight of a solid petroleum asphalt having a penetration value of 190 to 250, expressed as hundredths of a centimeter, under a load of 100 grams in a period of 5 seconds at 25° C., a ring and ball softening point of 90° F. to 105° F., an asphaltene content of not more than 18%, a specific gravity of 1.001 to 1.020 (25°/25° C.) and a Cleveland open cup flash point of 500° F. to 575° F., and (c) from 20 to 90%, based on the weight of (a), of carbon black.

9. A pneumatic tire characterized by quiet-riding qualities, having a thread consisting essentially of, in admixture, (a) synthetic rubbery polymeric material selected from the group consisting of polybutadiene, copolymers of butadiene with up to 55% by weight of combined styrene, and mixtures thereof, (b) from 5 to 30%, based on the weight of (a), of a hydrocarbon oil plasticizer for the said polymeric material having a boiling point in excess of 400° F., (c) from 18 to 60%, based on the weight of (a), a solid petroleum asphalt having a penetration value of 180 to 425, expressed as hundredths of a centimeter, under a load of 100 grams in a period of 5 seconds at 25° C. and a ring and ball softening point of 85° F. to 115° F., and (d) from 20 to 90%, based on the weight of (a), of carbon black.

10. A pneumatic tire characterized by quiet-riding qualities, having a tread consisting essentially of, in admixture, (a) synthetic rubbery polymeric material selected from the group consisting of polybutadiene, copolymers of butadiene with up to 55% by weight of combined styrene, and mixtures thereof, (b) from 5 to 30%, based on the weight of (a), of a hydrocarbon oil plasticizer for said polymeric material having a boiling point in excess of 400° F., (c) from 30 to 50%, based on the weight of (a), of a solid petroleum asphalt having a penetration value of 190 to 250, expressed as hundredths of a centimeter, under a load of 100 grams in a period of 5 seconds at 25° C., a ring and ball softening point of 90° F. to 105° F., an asphaltene content of not more than 18%, a specific gravity of 1.001 to 1.020 (25°/25° C.), and a Cleveland open cup flash point of 500° F. to 575° F., and (d) from 20 to 90% based on the weight of (a), of carbon black.

11. A pneumatic tire characterized by quiet-riding qualities, having a tread consisting essentially of, in admixture, (a) synthetic rubbery polymeric material selected from the group consisting of polybutadiene, copolymers of butadiene with up to 55% by weight of combined styrene, and mixtures thereof, (b) from 30 to 50%, based on the weight of (a), of a solid petroleum asphalt having a penetration value of 190 to 250, expressed as hundredths of a centimeter, under a load of 100 grams in a period of 5 seconds at 25° C., a ring and ball softening point of 90° F. to 105° F., an asphaltene content of not more than 18%, a specific gravity of 1.001 to 1.020 (25°/25° C.) and a Cleveland open cup flash point of 500° F. to 575° F., and (c) from 20 to 90%, based on the weight of (a), of carbon black.

12. A tire tread stock consisting essentially of, in admixture, (a) synthetic rubbery polymeric material selected from the group consisting of polybutadiene, copolymers of butadiene with up to 55% by weight of combined styrene, and mixtures thereof, (b) from 18 to 60%, based on the weight of (a), of a solid petroleum asphalt having a penetration value of 180 to 425 expressed as hundredths of a centimeter under a load of 100 grams in a period of 5 seconds at 25° C. and a ring and ball softening point of 85° F. to 115° F., and (c) from 20 to 90%, based on the weight of (a), of carbon black.

13. A tire tread stock consisting essentially of, in admixture, (a) synthetic rubbery butadiene-styrene copolymer containing from 20% to 40% by weight of combined styrene (b) from 18 to 60%, based on the weight of (a), of a solid petroleum asphalt having a penetration value of 180 to 425, expressed as hundredths of a centimeter, under a load of 100 grams in a period of 5 seconds at 25° C. and a ring and ball softening point of 85° F. to 115° F., and (c) from 20 to 90%, based on the weight of (a), of carbon black.

14. A tire tread stock consisting essentially of, in admixture, (a) synthetic rubbery polymeric material selected from the group consisting of polybutadiene, copolymers of butadiene with up to 55% by weight of combined styrene, and mixtures thereof, (b) from 5 to 30%, based on the weight of (a) of a hydrocarbon oil plasticizer for the said polymeric material having a boiling point in excess of 400° F., (c) from 18 to 60%, based on the weight of (a), of a solid petroleum asphalt having a penetration value of 180 to 425, expressed as hundredths of a centimeter, under a load of 100 grams in a period of 5 seconds at 25° C. and a ring and ball softening point of 85° F. to 115° F., and (d) from 20 to 90%, based on the weight of (a), of carbon black.

15. A tire tread stock consisting essentially of, in admixture, (a) synthetic rubbery polymeric material selected from the group consisting of polybutadiene, copolymers of butadiene with up to 45% by weight of combined styrene, and mixtures thereof, (b) from 18 to 60%, based on the weight of (a), of a solid petroleum asphalt having a penetration value of 190 to 250, expressed as hundredths of a centimeter, under a load of 100 grams in a period of 5 seconds at 25° C., a ring and ball softening point of 90° F. to 105° F., an asphaltene content of not more than 18%, a specific gravity of 1.001 to 1.020 (25°/25° C.) and a Cleveland open cup flash point of 500° F. to 575° F., and (c) from 20 to 90%, based on the weight of (a), of carbon black.

16. A tire tread stock consisting essentially of, in admixture, (a) synthetic rubbery polymeric material selected from the group consisting of polybutadiene, copolymers of butadiene with up to 55% by weight of combined styrene, and mixtures thereof, (b) from 5 to 30%, based on the weight of (a), of a hydrocarbon oil plasticizer for the said polymeric material having a boiling point in excess of 400° F., (c) from 30 to 50%, based on the weight of (a), of a solid petroleum asphalt having a penetration value of 190 to 250, expressed as hundredths of a centimeter, under a load of 100 grams in a period of 5 seconds at 25° C., a ring and ball softening point of 90° F. to 105° F., an asphaltene content of not more than 18%, a specific gravity of 1.001 to 1.020 (25°/25° C.), and a Cleveland open cup flash point of 500° F. to 575° F., and (d) from 20 to 90%, based on the weight of (a), of carbon black.

17. A tire tread stock consisting essentially of, in admixture, (a) synthetic rubbery polymeric material selected from the group consisting of polybutadiene, copolymers of butadiene with up to 55% by weight of combined styrene, and mixtures thereof, (b) from 30 to 50%, based on the weight of (a), of a solid petroleum asphalt having a penetration value of 190 to 250, expressed as hundredths of a centimeter, under a load of 100 grams in a period of 5 seconds at 25° C., a ring and ball softening point of 90° F. to 105° F., an asphaltene content of not more than 18%, a specific gravity of 1.001 to 1.020 (25°/25° C.), and a Cleveland open cup flash point of 500° F. to 575° F., and (c) from 20 to 90%, based on the weight of (a), of carbon black.

References Cited by the Examiner

UNITED STATES PATENTS

| | | | |
|---|---|---|---|
| 2,648,644 | 8/1953 | McMillan et al. | 260—28.5 |
| 2,700,655 | 1/1955 | Endres et al. | 260—28.5 |
| 2,807,596 | 9/1957 | Flickinger | 260—28.5 |
| 2,964,083 | 12/1960 | Pfau et al. | 152—330 |

OTHER REFERENCES

Wheeler et al.: Softeners for GR–S Tires, Rubber Age, vol. 61, July 1947, pp. 437–438.

MORRIS LIEBMAN, *Primary Examiner.*